Sept. 4, 1934.　　　　　K. R. HERMAN　　　　　1,972,224
MOTOR DELIVERY VEHICLE

Filed Jan. 5, 1931　　　5 Sheets-Sheet 3

INVENTOR
Kenneth R. Herman
BY
Whittemore Hulbert Whittemore
+ Belknap
ATTORNEYS.

Sept. 4, 1934.  K. R. HERMAN  1,972,224
MOTOR DELIVERY VEHICLE
Filed Jan. 5, 1931  5 Sheets-Sheet 4

INVENTOR
Kenneth R. Herman.
BY
Whittemore, Hulbert Whittemore
+Belknap ATTORNEYS.

Sept. 4, 1934.  K. R. HERMAN  1,972,224
MOTOR DELIVERY VEHICLE
Filed Jan. 5, 1931   5 Sheets-Sheet 5

INVENTOR.
Kenneth R. Herman
BY 
ATTORNEY.

Patented Sept. 4, 1934

1,972,224

UNITED STATES PATENT OFFICE 1,972,224

MOTOR DELIVERY VEHICLE

Kenneth R. Herman, Detroit, Mich., assignor, by mesne assignments, to Continental - Divco Company, Detroit, Mich., a corporation of Michigan Application January 5, 1931, Serial No. 506,790

20 Claims. (Cl. 280—2)

The invention relates generally to motor delivery vehicles and more particularly to vehicles of the house-to-house delivery type such, for example, as retail milk delivery trucks.

One of the principal objects of the invention is to construct an improved motor vehicle of the above type having a low level passage or aisle extending transversely completely through the vehicle and providing standing height clearance beneath a vehicle top of ordinary height.

Another object is to provide in a vehicle of the above mentioned type an improved method of control which closely simulates the standard control of a conventional motor vehicle but is modified to such an extent as to facilitate the operation of the vehicle from either a standing or seated position in the aisle and is also arranged to make available the maximum load-carrying space within the vehicle.

A further object is to provide a vehicle of the house-to-house delivery type with a strong and durable chassis containing full length one-piece chassis sill bars so constructed and arranged as to provide a transverse aisle extending completely across the vehicle.

Another object of the invention is to construct a chassis for a house-to-house delivery vehicle having continuous one-piece sill bars extending above the axles, each provided with drop center intermediate portions, said sill members being constructed to have the drop center portion of a length corresponding substantially to the width of the aisle and having abruptly curved portions immediately forward and rearward of the aisle, thereby providing the maximum amount of the sill members at a level above the axles for the direct support of the load-carrying floors.

One of the advantages of the particular delivery vehicle herein specifically described and illustrated is due to the fact that the various parts of the vehicle are constructed as closely as possible to the accepted standard practice for motor vehicle construction except where the peculiarities of the house-to-house delivery type of vehicle require a modification from conventional practice in order to satisfactorily meet the unusual demands of this specific type of vehicle. My invention therefore resides partly in the provision of a simplified design containing the essential requirements for a vehicle of the house-to-house delivery type while eliminating unnecessary peculiarities hereinbefore associated with such vehicles.

With the foregoing as well as other objects in view, the invention consists in the peculiar construction and arrangement of parts which will be more fully hereinafter described, especially when considered in connection with the accompanying drawings, wherein.

Figure 1:
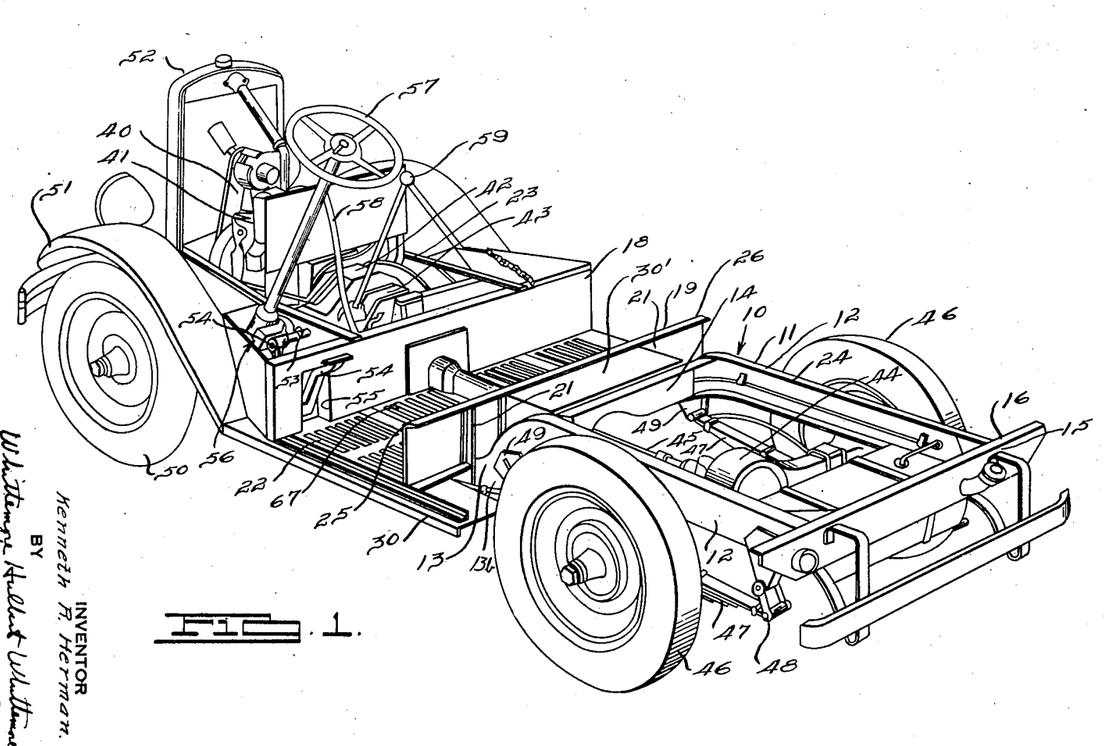
Figure 1 is a perspective view of a motor delivery chassis constructed in accordance with this invention.
Figure 4:
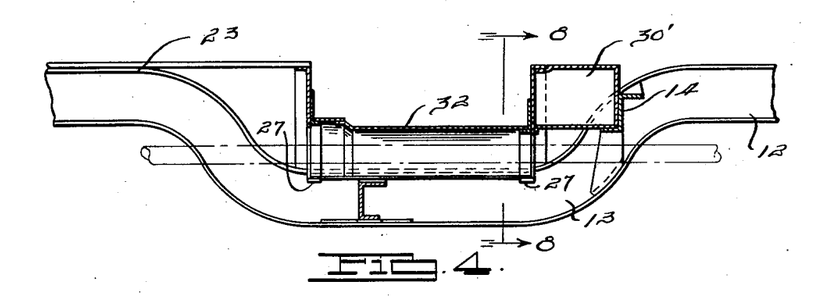
Figure 4 is a sectional view taken on the line 4—4 of Figure 2.

Referring now to the drawings, it will be noted that there is illustrated in Figure 1 a motor delivery vehicle chassis construction 10 comprising a frame 11 formed of laterally spaced sill members 12 substantially channel-shaped in cross section and having an intermediate depressed portion 13 between the front and rear wheels of the chassis forming the support for the transverse low level aisle arranged preferably one step above the ground. The depressed portion 13 of each sill member is substantially straight for a distance corresponding to the full width of the aisle adjacent the forward and rearward boundaries of the aisle. Each sill member curves abruptly upward from the depressed portion as indicated at 13a and 13b. The front and rear portions 23 and 24 respectively of each sill member are preferably in axial alignment and due to the abrupt curved portions 13a and 13b they extend as closely as practicable to the aisle at the normal height and therefore form the support for both the front and the rear load-carrying floors. The sill members 12 are secured in lateral spaced relation at a plurality of longitudinally spaced points by means of crossbraces, two of which are designated in Figure 1 by the reference characters 14 and 15. The crossbrace 15 is secured to the rear ends of the sills 12 and is provided with portions 16 projecting laterally outwardly from opposite sides of the sills 12 for supporting the overhanging portions of the body to be presently described. The crossbrace 14, on the other hand, is in the form of a plate substantially Z-shaped in cross section and forms a structural member for resisting angular or twisting movements of the sills 12. As shown particularly in Figure 4, the plate-like brace 14 is disposed between the rear upright portions 13b of the frame with the opposite ends extending within the channels of the upright portions and secured to the latter. Thus, it will be apparent that the plate-like member 14 functions as a torsional brace for the frame and reinforces the drop section thereof.

Figure 5:
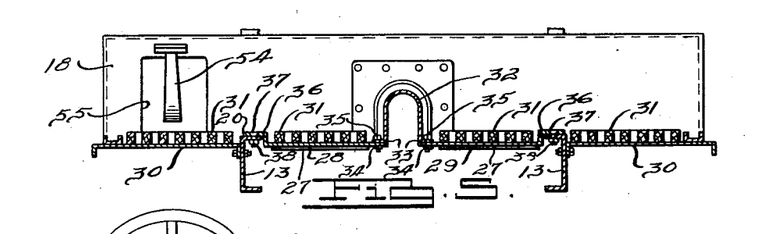
Figure 5 is a sectional view taken on the line 5—5 of Figure 2.
Figure 9:
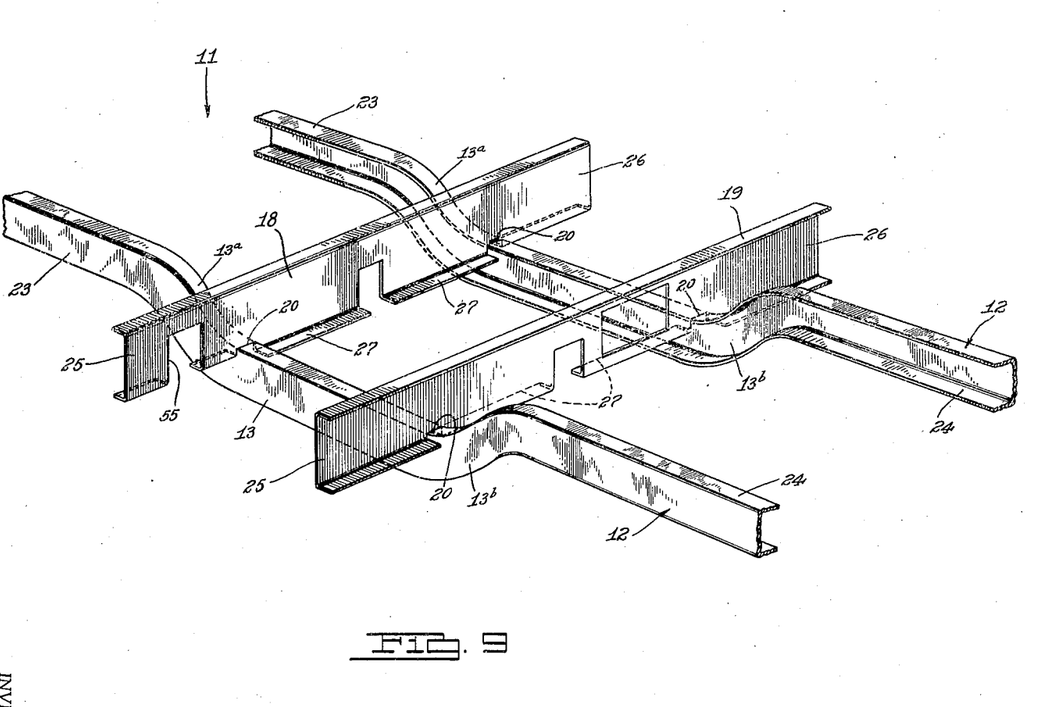
Figure 9 is a perspective view of the chassis frame and cross member for supporting the floor sections and running board.

Supported in spaced relation longitudinally of the chassis upon the drop section 13 of the frame is a pair of cross panels 18 and 19 extending transversely of the frame as shown in Figure 1. The lower edges of the cross panels 18 and 19 are slotted as at 20 for receiving portions of the sills 12 and are secured to the latter by means of vertically extending brackets 21. These brackets are shown in Fig. 1 but are omitted from Fig. 9 in order to more clearly show the construction of the cross panel 19 in Fig. 9. The panels 18 and 19, respectively form the front and rear walls of the low level through passage 22 and the upper edges of the panels are preferably in substantial alignment with the front and rear portions 23 and 24, respectively, of the frame. The length of the cross panels 18 and 19 is preferably greater than the width of the chassis frame with the result that the opposite ends 25 and 26 of the panels project laterally outwardly beyond opposite sides of the frame and serve to cooperate with the lateral projecting portions 16 of the rear crossbrace 15 to support the portions of the body adapted to overhang the sills 12. The central portions of the panels 18 and 19 are substantially Z-shaped in cross section with the flanges at the upper edges projecting respectively forwardly and rearwardly from the panels and the flanges 27 on the bottom edge portions of the panels between the sills 12 projecting in the opposite direction and accordingly extend into the passage. It is to be noted, however, that the projecting end portions 25 and 26 of the panels are substantially channel-shaped in cross section with the flanges at the bottom edges projecting in the same direction as the flanges at the top edges. The flanges 27 serve to support the front and rear edge portions of the floor sections 28 and 29 between the sill members 12, while the corresponding lower flanges on the projecting ends of the panels are secured to suitable running boards 30 and since it has been previously stated that the panels are slotted as at 20 to receive portions of the sills, it will be apparent that the lower flanges on the panels will support the floor sections and running boards at a level slightly below the top surfaces of the depressed sections 13 of the sill members. As shown in Figure 5, the top surfaces of the floor sections 28 and 29 and the running boards 30 are supported by the lower flanges of the panels in alignment and at such a level below the top surfaces of the depressed section 13 that when the tread sections 31 are supported upon the flooring and running boards, they will lie flush with the top surfaces of the depressed sill portions 13. The arrangement is such that the running boards positioned upon opposite sides of the chassis cooperate with the floor sections 28 and 29 to form a continuous flooring from the outer edge of one running board to the corresponding edge of the other running board interrupted only at the center by the propeller shaft housing 32. Supported between and secured to the rear cross panel 19 and the crossbrace 14 is a tool cabinet 30' accessible from the platform 22 through a suitable opening in the rear panel 19 adapted to be closed by a door 31'. The above construction is such that the cabinet not only serves as a storage compartment for tools, but also functions to reinforce the cross panel from the brace 14.

Figure 2:
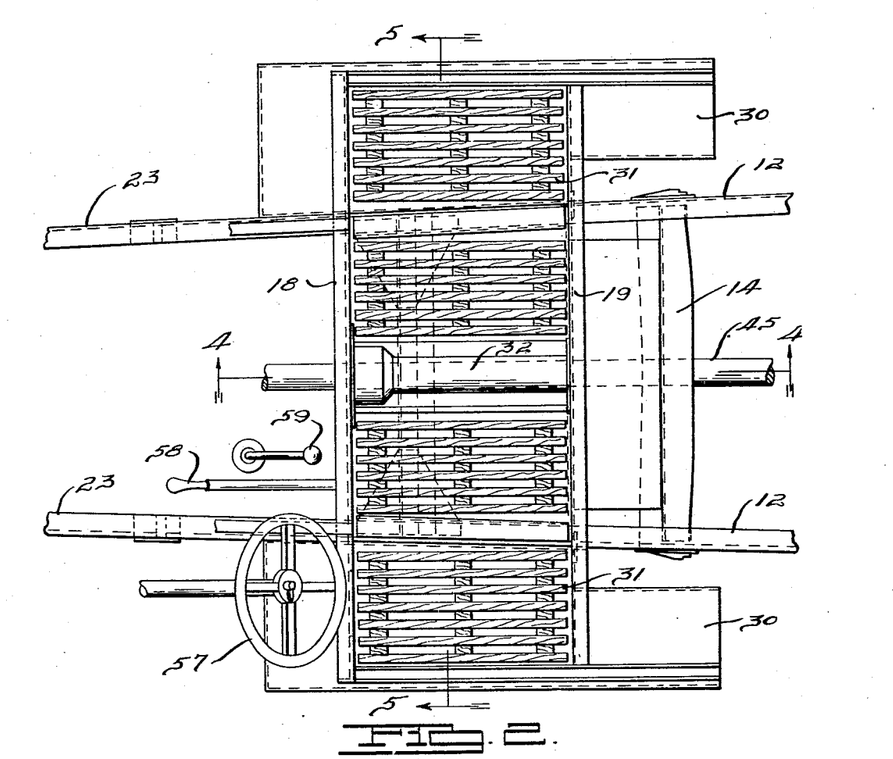
Figure 2 is a fragmentary plan view of the construction shown in Figure 1.

While several methods may be employed for lowering the propeller shaft and thereby eliminating the tunnel 32, I prefer not to complicate the running gear of the vehicle by employing such methods, especially in view of the fact that the tunnel in the present instance is not of sufficient height to be objectionable. As shown particularly in Figures 1 and 2, the tunnel extends across the passage 22 and is secured at the front end to the rear surface of the front cross panel 18 and at the rear end to the front surface of the cross panel 19. The lower longitudinal edges of the tunnel are bent laterally outwardly to form foot flanges 33 which serve to secure the inner marginal portions of the flooring sections 28 and 29 in place. For accomplishing the above result, it will be noted from Figure 5 of the drawings that suitable securing strips 34 are welded or otherwise secured to the bottom surfaces of the sections 28 and 29 adjacent the inner edges thereof for receiving the fastener elements 35 carried by the foot flanges 33. Thus, from the foregoing it will be observed that the floor sections 28 and 29 are rigidly supported since the front and rear edges thereof are secured to the plates 18 and 19 and the inner edges are secured to the tunnel 32 which in turn is rigidly secured at the opposite ends to the cross panels 18 and 19. The outer edges of the floor sections 28 and 29, on the other hand, are bent upwardly as at 36 terminating in flanges 37 adapted to overlap the depressed sill sections 13 and secured to the latter by the fastener elements 38. It will further be observed that my improved method of supporting the flooring permits lowering the latter to a relatively low level without sacrificing road clearance or reducing the cross sectional area of the depressed section 13 of the frame.

Figure 3:
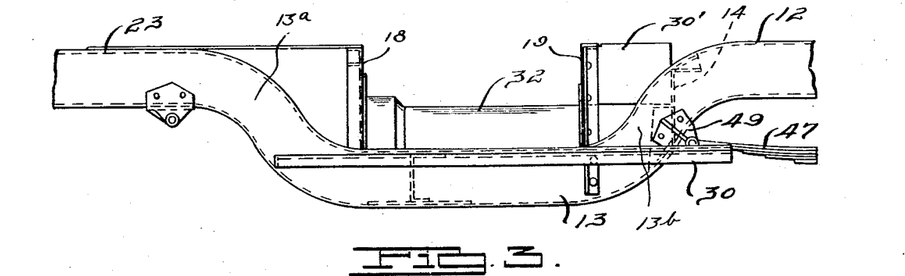
Figure 3 is a side elevational view of the construction shown in Figure 2.

Supported by the forward end portions 23 of the sill members 12 in advance of the low level platform 22 is a power unit 40 substantially of conventional design comprising an internal combustion engine 41 of the multi-cylinder reciprocating type having the rear end of the drive shaft thereof connected through suitable clutch mechanism, located within the housing 42, to a transmission unit 43. The transmission unit is preferably of the usual sliding gear selective type and is operatively connected to suitable differential gearing located within the housing 44 by means of the propeller shaft 45. The differential gearing within the housing 44 is connected in the usual way to the rear wheels 46 of the vehicle which are located in rear of the passage 22 and serve to drive the vehicle. The rear axle assembly comprising the differential 44 and wheels 46 is connected to the rear portions 24 of the sill members by means of leaf springs 47 having the central portions clamped or otherwise suitably secured to opposite end portions of the rear axle and having the rear ends shackled as at 48 in the usual manner to the adjacent ends of the sills 12. The front ends of the springs 47 are pivotally connected to suitable brackets 49 secured to the central portions of the rear uprights 13b of the sills 12 as clearly shown in Figure 3. With the above construction, it will be observed that the driving force exerted by the drive wheels 46 is applied through the rear springs 47 to the upright portions 13b with the result that the bending moment of the driving force upon the sill members is reduced to a minimum. The front axle of the vehicle is preferably of the steering type having the steering wheels 50 journaled thereon and adapted to be connected to the forward end portions 23 of the sill members 12 by the conventional leaf springs. Suitable fenders 51 are provided for the front wheels 50 and are secured to the forward ends of the running boards 30 in any suitable manner. Mounted upon the front end portions of the sills 12 between the fenders 51 and in advance of the internal combustion engine 41 is a heat exchange unit or radiator 52 of standard design adapted to be connected in the water circulatory system of the engine for cooling purposes.

Figure 6:
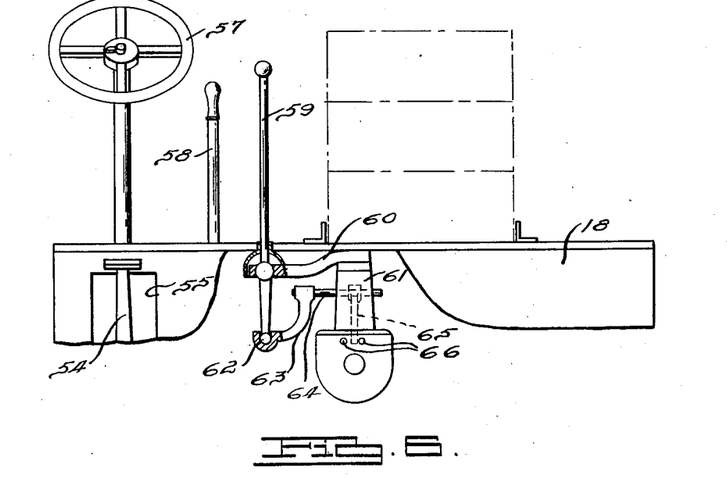
Figure 6 is a side elevational view showing the arrangement of controls and the storage space to one side of the controls.

While the controls function in the usual way for manipulating the vehicle, nevertheless, it is to be noted from Figure 6 that all of the controls are localized adjacent one side of the chassis so as to afford a space of relatively great area adjacent the controls for storage purposes. It will further be apparent that by locating all of the controls adjacent one side of the chassis, the operator is permitted to manipulate the vehicle from a position just inside of the vehicle. In detail, it will be observed from Figures 1 and 6 that the usual rockshaft 53 for actuating the front and rear brakes and clutch mechanism within the housing 42 is merely extended through the left side of the frame so that the control pedal 54 for rocking the shaft 53 to actuate the clutch and apply the brakes may be positioned exteriorly of the sill members adjacent the left side of the passage 22. In this connection it is to be noted that the panel 18 is slotted as at 55 to permit the control pedal 54 to project into the passage 22. The steering mechanism designated generally by the reference character 56 is also located exteriorly of the frame upon the left side thereof so as to permit locating the steering wheel 57 in a convenient position adjacent the left side of the vehicle. The steering mechanism 56 is of standard design and is connected to the steering wheels in the usual manner. The location of the parking brake actuating lever 58 is the same is the present instance as in a great many vehicles now commercially produced and accordingly, further description of the same is believed unnecessary. However, in order to locate the transmission control lever 59 adjacent the left side of the frame, it is necessary to provide the novel arrangement diagrammatically illustrated in Figure 6 of the drawings. The mechanism utilized for offsetting the control lever 59 is of such design as to permit the same to be operatively connected to the transmission without altering or otherwise interfering with the standard construction of the latter. The aforesaid mechanism comprises a supporting arm 60 having one end secured to the top of the transmission tower 61 and projecting laterally toward the left side of the vehicle from the tower for rockably and rotatably receiving the control lever 59. The lower end of the control lever 59 is universally connected as at 62 to a yoke 63 secured to a rockshaft 64 which in turn is journaled in the transmission tower 61 and has secured thereto within the tower an actuating lever 65. The lower end of the actuating lever 65 assumes a position between the transmission gear actuating rails 66 for selectively operating the latter in the usual way. The above arrangement is such that manipulation of the control lever in the conventional manner operates the gears in the transmission to effect the desired gear ratio combination. As previously stated, the control lever 59 is so connected with the supporting member 60 and yoke 63 as to permit rotation of the lever. Rotation of the control lever 59 is important since the latter is connected to the throttle valve (not shown) of the carburetor for controlling the speed of the engine. The above control of the carburetor is in addition to the usual accelerator control designated generally by the reference character 67 and the conventional throttle control on the steering wheel.

Thus, from the foregoing it will be observed that my improved motor delivery vehicle chassis while adhering closely to standard practice embodies many novel features which qualifies the same for efficient use as a house to house delivery vehicle of the type hereinbefore stated. It will further be apparent that the aisle through the vehicle, together with the running boards, forms a unitary construction with the chassis.

Figure 7:
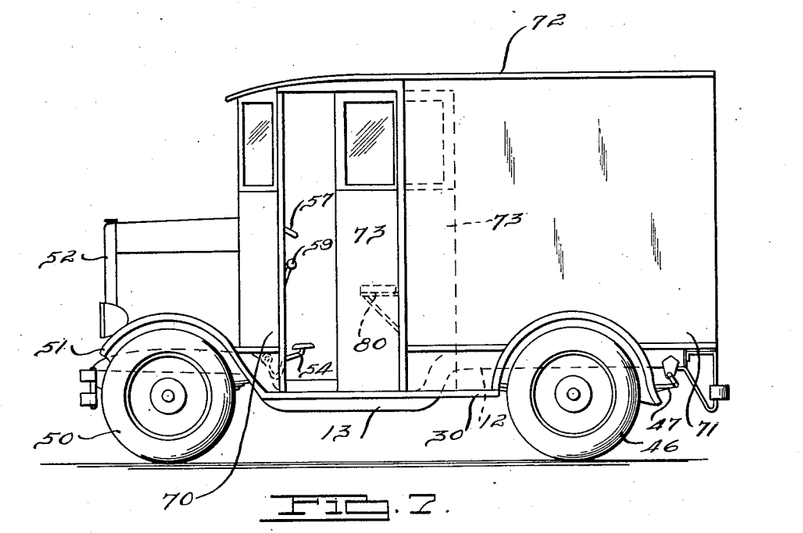
Figure 7 is an elevational view of my improved vehicle construction showing the body in assembled relation with the chassis.
Figure 8:
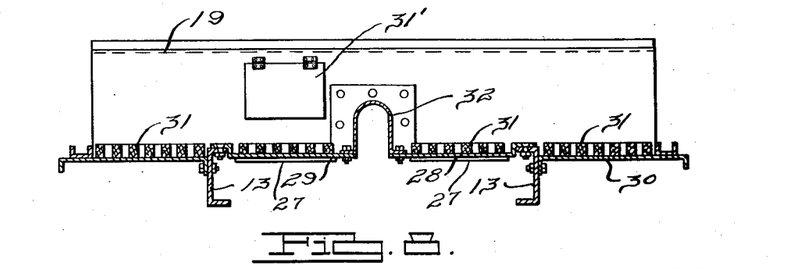
Figure 8 is a sectional view taken on the line 8—8 of Figure 4.

Referring now briefly to the body of the vehicle, it will be noted from Figure 7 that the body comprises three main sections, a front section 70, a rear section 71 and a top unit 72. In the assembled relation of the body before the same is secured to the chassis, the top section 72 serves as the only means for securing the front and rear sections 70 and 71 together. The front and rear sections 70 and 71 are spaced from each other a distance substantially equal to the width of the aisle 22 through the chassis so as to provide openings in opposite sides of the vehicle permitting the operator to enter or leave the vehicle from either side. The openings are closed by suitable doors 73 carried by the top section 72 for sliding movement between the inner and outer panels of the body. In this connection it is to be noted that the doors are of the overlapping type and the lower ends thereof project below the body into engagement with the outer edge portions of the running boards. The arrangement is such as to completely close the door openings from the running boards to the top. The flooring of both sections 70 and 71 of the body are supported respectively by the front and rear portions 23 and 24 of the chassis frame and the marginal edges of the flooring adjacent the through passage are adapted to rest upon the lateral flanges of the cross panels 18 and 19. In order to provide maximum storage space within the body without correspondingly increasing the tread of the vehicle chassis, the body is adapted to overhang the chassis frame and the overhanging portions thereof are supported at the rear by the ends 16 of the rear cross member 15 and at the front by the projecting ends 25 and 26 of the cross panels. From the above it will be apparent that the body is so designed and the controls for the vehicle so located that articles may be supported in the front section 70 of the body as well as in the rear section 71.

While the foregoing construction is such as to permit operating the vehicle from a standing position within the passage therethrough, it is to be noted that I provide a folding seat 80 capable of being readily moved from a position out of the passageway 22 to the operative position shown in Figure 7. While it will be apparent from the above figure that when the seat 80 is in operative position, it projects into the passageway 22, it is to be noted that the position of this seat relative to the controls is such as to permit the operator to walk freely through the passage without folding or otherwise interfering with the seat.

What I claim as my invention is:

1. A vehicle chassis construction having a drop center frame, plates extending transversely of the frame and secured to the dropped portions thereof in spaced relation longitudinally of the chassis, flooring interposed between the plates and having marginal edge portions supported by the plates and dropped portion of the frame, said plates having the opposite ends projecting laterally beyond opposite sides of the dropped portion, running boards secured to the projecting portions of the plates at the level of the flooring aforesaid to form extensions therefor and having the outer edge portions extending beyond the ends of the plates for engaging a closure member.

2. A vehicle chassis construction having a drop center frame provided with laterally spaced sill members, plates extending transversely of the drop center portion of the frame and secured to the latter portion in spaced relation longitudinally of the chassis, said plates having opposite end portions projecting laterally beyond opposite sides of the frame and having marginal flanges on the lower edges thereof spaced below the level of the top surfaces of the drop center frame portions, flooring between the drop center frame portions and plates supported upon the flanges aforesaid to assume a level substantially flush with the top surfaces of the drop center frame portions, and flooring carried by the projecting portions aforesaid of the plates substantially flush with the flooring aforesaid to form a continuation thereof.

3. A vehicle chassis construction having a drop center frame provided with laterally spaced sill members, plates extending transversely of the dropped portion of the frame and secured to the latter in spaced relation longitudinally of the chassis, a tunnel interposed between the plates and having the opposite ends rigidly secured thereto, separate floor sections arranged upon opposite sides of the tunnel between the latter and low level portions of the sills, and means carried by said tunnel for supporting the inner marginal edges of the floor.

4. A vehicle chassis construction having a drop center frame provided with laterally spaced sills, plates extending transversely of the drop center portion of the frame and secured to the latter portion in spaced relation longitudinally of the chassis, a tunnel interposed between the low level portions of the sills and having the opposite ends rigidly secured to the plates, flooring positioned upon opposite sides of the tunnel at a level flush with the top surfaces of the low level portions of the sills, and flanges projecting laterally outwardly from the tunnel below the level aforesaid for supporting the inner marginal edges of the floor sections.

5. A vehicle chassis construction having a drop center frame provided with laterally spaced sills, plates extending transversely of the drop center portion of the frame and secured to the latter portion in spaced relation longitudinally of the chassis, a tunnel interposed between the low level portions of the sills and having the opposite ends rigidly secured to the plates, floor sections upon opposite sides of the tunnel, and means upon the plates and opposite walls of the tunnel for supporting the floor sections at a level wherein the top surfaces thereof lie flush with the top surfaces of the low level frame sections.

6. A vehicle having in combination, a chassis having a drop center frame provided with laterally spaced sill members, plates extending transversely to the drop center portion of the frame and secured to the latter at spaced points longitudinally of the chassis, said plates having portions projecting laterally outwardly from opposite sides of the frame, a cross member for the rear end portion of the frame having opposite end portions also projecting laterally outwardly from opposite sides of the frame, a body for the chassis having portions overhanging the frame and supported by the projecting portions of the plates and crossmember, and flooring interposed between the plates and supported thereby at substantially the level of the dropped center portion to provide a low level passage through the vehicle.

7. A vehicle chassis construction having a drop center frame, plates extending transversely of the frame and secured to the dropped portions thereof in spaced relation longitudinally of the chassis, said plates having the opposite ends projecting laterally beyond opposite sides of the dropped portion, the plates having flanges intermediate the chassis extending toward each other, and flanges beyond the opposite sides of the chassis extending away from each other, flooring interposed between the plates and having marginal edge portions supported by the flanges carried by said plates intermediate the chassis, and running boards being secured to the flanges carried by said plates without said chassis.

8. A vehicle chassis construction having a drop center frame, plates extending transversely of the frame and secured to the dropped portions thereof in spaced relation longitudinally of the chassis, said plates having the opposite ends projecting laterally beyond opposite sides of the dropped portion, the plates having flanges intermediate the chassis extending toward each other, and flanges beyond the opposite sides of the chassis extending away from each other, flooring interposed between the plates and having marginal edge portions supported by the flanges carried by said plates intermediate the chassis, and running board secured to the flanges carried by said plates without said chassis, said running boards extending beyond the projections of said plates longitudinally of the chassis and having inner marginal edges secured to the chassis.

9. A vehicle chassis construction having a drop center frame, plates extending transversely of the frame and secured to the dropped portions thereof in spaced relation longitudinally of the chassis, said plates having the opposite ends projecting laterally beyond opposite sides of the dropped portion, the plates having flanges intermediate the chassis extending toward each other, and flanges beyond the opposite sides of the chassis extending away from each other, flooring interposed between the plates and having marginal edge portions supported by the flanges carried by said plates intermediate the chassis, and running boards secured to the flanges carried by said plates without said chassis, said running boards extending beyond the projections of said plates both longitudinally and laterally of the chassis, and means carried by said running board beyond the ends of said plates for guiding a door.

10. A vehicle chassis construction having a drop center frame, plates extending transversely of the frame and secured to the dropped portions thereof in spaced relation longitudinally of the chassis, said plates having the opposite ends projecting laterally beyond opposite sides of the dropped portion, the plates having flanges intermediate the chassis extending toward each other, and flanges beyond the opposite sides of the chassis extending away from each other, flooring interposed between the plates and having marginal edge portions supported by the flanges carried by said plates intermediate the chassis, and running boards secured to the flanges carried by said plates without said chassis, said running boards extending beyond the projections of said plates both longitudinally and laterally of the chassis, and means carried by said running board beyond the ends of said plates for guiding a door, said door guiding means extending beyond the plates longitudinally of the chassis.

11. A vehicle chassis construction having a drop center frame, plates extending transversely of the frame and secured to the dropped portions thereof in spaced relation longitudinally of the chassis, said plates having the opposite ends projecting laterally beyond opposite sides of the dropped portion, the plates having flanges intermediate the chassis extending toward each other, and flanges beyond the opposite sides of the chassis extending away from each other, flooring interposed between the plates and having marginal edge portions supported by the flanges carried by said plates intermediate the chassis, and running boards secured to the flanges carried by said plates without said chassis, said running boards extending beyond the projections of said plates both longitudinally and laterally of the chassis, and means carried by said running board beyond the ends of said plates for guiding a door, said door guiding means extending beyond the plates longitudinally of the chassis, and a vehicle body having side walls supported substantially flush with the outer marginal edges of said running boards, said door guiding means extending within said vehicle side walls.

12. In a vehicle chassis of the character described, longitudinally extending sills having depressed portions intermediate their ends, front and rear plates extending transversely of said sills substantially adjacent the depressed portions thereof in spaced relation longitudinally of the chassis, a floor panel lying between said plates and secured thereto, said floor panel lying below the upper surface of said depressed sill portions, said plates having opposite ends projecting laterally beyond opposite sides of the depressed sill portions, and running boards secured to the projecting portions of said plates substantially at the level of said floor panel and extending rearwardly below said rear plate and therebeyond.

13. In a vehicle chassis of the character described, longitudinally extending sills having depressed portions intermediate their ends, front and rear plates extending transversely of said sills substantially adjacent the depressed portions thereof in spaced relation longitudinally of the chassis, a floor panel lying between said plates and secured thereto, said floor panel lying below the upper surface of said depressed sill portions, said plates having opposite ends projecting laterally beyond opposite sides of the depressed sill portions, running boards secured to the projecting portions of said plates substantially at the level of said floor panel and extending rearwardly below said rear plate and therebeyond, and floor tread sections resting on said floor panel and said running boards, said tread sections forming a substantially continuous and level floor transversely of said chassis.

14. In a vehicle chassis of the character described, longitudinally extending sills having depressed portions intermediate their ends, front and rear plates extending transversely of said sills substantially adjacent the depressed portions thereof in spaced relation longitudinally of the chassis, said plates being recessed to receive the upper portions of said sills, said plates having inwardly extending flanges between said depressed sill portions, said plates having opposite ends projecting laterally beyond said depressed sill portions, said plate projections having flanges, flooring supported by the first said flanges, and running boards extending beneath the flanges of said plate projections and extending rearwardly of said rear plate.

15. In a vehicle chassis of the character described, longitudinally extending sills having depressed portions intermediate their ends, front and rear plates extending transversely of said sills substantially adjacent the depressed portions thereof in spaced relation longitudinally of the chassis, a tunnel extending longitudinally of the vehicle and secured to said plates, floor sections secured to the tops of said depressed sill portions and extending toward said tunnel for attachment thereto, said floor sections being depressed between said tunnel and sills, and floor treads within depressions of said floor sections.

16. In a vehicle chassis of the character described, longitudinally extending sills having depressed portions intermediate their ends, front and rear plates extending transversely of said sills substantially adjacent the depressed portions thereof in spaced relation longitudinally of the chassis, a tunnel extending longitudinally of the vehicle and secured to said plates, floor sections secured to the tops of said depressed sill portions and extending toward said tunnel for attachment thereto, said floor sections being depressed between said tunnel and sills, and floor treads within the depressions of said floor sections, said floor treads having their upper surfaces substantially level with the upper surfaces of the portions of said floor sections which are secured to and above said depressed sill portions.

17. A vehicle chassis construction having longitudinally extending frame members each having a drop center portion, plates extending transversely of the frame members and secured to the dropped portions thereof in spaced relation longitudinally of the chassis, the lower edges of said plates between said frame members being flanged inwardly toward each other, flooring interposed between the plates and having marginal edge portions supported by the flanges of said plates, said plates having the opposite ends projecting laterally beyond opposite sides of the dropped portion, and running boards secured to the projecting portions of the plates at the level of the flooring aforesaid to form extensions therefor.

18. A vehicle chassis construction having longitudinally extending frame members each having a drop center portion, plates extending transversely of the frame members and secured to the dropped portions thereof in spaced relation longitudinally of the chassis, the lower edges of said plates between said frame members being flanged inwardly toward each other, flooring interposed between the plates and having marginal edge portions supported by the flanges of said plates, said plates having the opposite ends projecting laterally beyond opposite sides of the dropped portions, and running boards separate from said flooring and secured to the projecting portions of the plate at the level of the flooring aforesaid to form extensions therefor.

19. A vehicle chassis construction having longitudinally extending frame members each having a drop center portion, plates extending transversely of the frame members and secured to the dropped portions thereof in spaced relation longitudinally of the chassis, the lower edges of said plates between said frame members being flanged inwardly toward each other, flooring interposed between the flanges of said plates and having marginal edge portions supported by the plates, said plates having the opposite ends projecting laterally beyond opposite sides of the dropped portions, and running boards secured to the projecting portions of the plates at the level of the flooring aforesaid to form extensions therefor, said running boards including portions extending beyond said plates longitudinally of the chassis frame.

20. A vehicle chassis construction having longitudinally extending frame members each having a drop center portion, plates extending transversely of the frame members and secured to the dropped portions thereof in spaced relation longitudinally of the chassis, the lower edges of said plates between said frame members being flanged inwardly toward each other, flooring interposed between the plates and having marginal edge portions supported by the flanges of said plates, said plates having the opposite ends projecting laterally beyond opposite sides of the dropped portions, and running boards separate from said flooring and secured to the projecting portions of the plate at the level of the flooring aforesaid to form extensions therefor, the inner longitudinal edge of said running boards being secured to the chassis frame.

KENNETH R. HERMAN.